(12) United States Patent
Guelbenzu Michelena et al.

(10) Patent No.: US 11,451,192 B2
(45) Date of Patent: Sep. 20, 2022

(54) AUTOMATED PHOTOVOLTAIC PLANT INSPECTION SYSTEM AND METHOD

(71) Applicant: ACCIONA ENERGIA S.A., Sarriguren (ES)

(72) Inventors: Eugenio Guelbenzu Michelena, Sarriguren (ES); Asun Padros Razquin, Sarriguren (ES); Miguel De La Parra Abad, Sarriguren (ES)

(73) Assignee: ACCIONA ENERGIA S.A., Sarriguren (ES)

( * ) Notice: Subject to any disclaimer, the term of this patent is extended or adjusted under 35 U.S.C. 154(b) by 281 days.

(21) Appl. No.: 16/772,930

(22) PCT Filed: Dec. 14, 2017

(86) PCT No.: PCT/ES2017/070815
§ 371 (c)(1),
(2) Date: Jun. 15, 2020

(87) PCT Pub. No.: WO2019/115843
PCT Pub. Date: Jun. 20, 2019

(65) Prior Publication Data
US 2021/0167726 A1    Jun. 3, 2021

(51) Int. Cl.
*H02S 50/15* (2014.01)
*G06T 7/13* (2017.01)
(Continued)

(52) U.S. Cl.
CPC .............. *H02S 50/15* (2014.12); *G01N 25/72* (2013.01); *G06T 7/0004* (2013.01); *G06T 7/13* (2017.01);
(Continued)

(58) Field of Classification Search
CPC ............... H02S 50/15; H02S 50/10; G06T 2207/10048; G06T 2207/10024;
(Continued)

(56) References Cited

U.S. PATENT DOCUMENTS 11,153,496 B1 * 10/2021 Wang ................ H04N 5/23299
2007/0297671 A1 * 12/2007 Yamamoto ......... G06V 30/1478
382/170

(Continued)

FOREIGN PATENT DOCUMENTS

ES          2482891 A1    8/2014
WO    2011/152445 A1    12/2011

OTHER PUBLICATIONS

International Search Report and Written Opinion for Corresponding International Application No. PCT/ES2017/070815 (8 Pages) (dated Apr. 5, 2018).

*Primary Examiner* — Phi Hoang
(74) *Attorney, Agent, or Firm* — Lucas & Mercanti, LLP

(57) ABSTRACT

Systems and methods are provided for automatically inspecting photovoltaic (PV) installations. The system utilizes drones flying preprogrammed routes to conduct aerial thermography of PV modules for inspection (i.e., gathering IR images of the PV modules). The system conducts analytics on the gathered images to determine defects in the PV modules of the PV installation, classifies detected defects, issues reports automatically, and retains technical data of every module included in the database of a PV installation for trend analysis and preventative and predictive maintenance analysis.

18 Claims, 6 Drawing Sheets

(51) Int. Cl.
*G01N 25/72* (2006.01)
*G06T 7/00* (2017.01)

(52) U.S. Cl.
CPC ............... *G06T 2207/10024* (2013.01); *G06T 2207/10048* (2013.01); *G06T 2207/30108* (2013.01)

(58) Field of Classification Search
CPC . G06T 7/13; G06T 2207/30108; G01N 25/72; Y02E 10/50
See application file for complete search history.

(56) References Cited

U.S. PATENT DOCUMENTS

| | | | | |
|---|---|---|---|---|
| 2009/0263035 | A1* | 10/2009 | Li | G06T 7/0002 382/250 |
| 2012/0310427 | A1* | 12/2012 | Williams | H02J 13/00002 702/182 |
| 2013/0279758 | A1* | 10/2013 | Burry | G06V 30/15 382/105 |
| 2015/0161442 | A1* | 6/2015 | Sadka | G06Q 50/06 382/113 |
| 2017/0184524 | A1* | 6/2017 | Uetaki | G01J 5/0066 |
| 2017/0277966 | A1* | 9/2017 | Abousleman | H04N 5/33 |
| 2017/0349279 | A1* | 12/2017 | Garcia-Gabin | G01N 21/88 |

* cited by examiner

AUTOMATED PHOTOVOLTAIC PLANT INSPECTION SYSTEM AND METHOD

CROSS REFERENCE TO RELATED APPLICATION

This Application is a 371 of No. PCT/ES2017/070815, filed Dec. 14, 2017, which is incorporated herein by reference.

OBJECT OF THE INVENTION

The present invention relates generally to systems and methods for inspecting photovoltaic energy plants. More particularly, this invention pertains to systems and methods for inspecting photovoltaic (PV) cells in a photovoltaic energy plant by capturing and reviewing infrared images (i.e., thermal images) of the PV cells.

BACKGROUND OF THE INVENTION

Renewable energy in general and solar photovoltaic (PV) energy in particular, is growing in the commercial energy market. Multi-megawatts PV plants are being installed worldwide. PV modules must be inspected periodically because they degrade and fail over time, reducing output of these installations. Thermal inspection of several thousands to millions of PV modules is almost impossible to manage using present methods.

Solar PV power plants of such large scale require enormous amounts of resources for both inspection and management. It is a common practice for power plants to hire people to manually check panels. However, the use of human personnel to identify malfunctioning panels requires a team of engineers and operators to constantly inspect the plant. And even with ongoing manual inspections, with the larger PV Power Plants, this task is so great that it is scarcely possible to perform an annual check of all of the modules.

Additionally, once the thermographic images (e.g., infrared IR images) have been taken of the PV installation, post processing and analysis for large PV plants implies a prohibitively large amount of time (nearing a year) when they are inspected and reviewed semi-manually using the software of the IR cameras. There is increasing evidence of panel underperformance due to severe environmental conditions (e.g., "soiling" in dusty deserted areas).

By way of example, the "El Romero" solar PV plant in Chile belonging to the Applicant requires review of more than 18,000 infrared (IR) thermal-images corresponding to 780,000 PV modules to conduct a single, semi-automated inspection of the modules of the facility. This process generally takes in excess of 3 months, and larger PV installations are being constructed.

The system and method for inspecting photovoltaic energy plants of the present invention solve all the aforementioned drawbacks.

DESCRIPTION OF THE INVENTION

Systems and methods are provided for automatically inspecting photovoltaic (PV) installations. The system utilizes drones flying preprogrammed routes to conduct aerial thermography of PV modules for inspection (i.e., gathering IR images of the PV modules). The system conducts analytics on the gathered images to determine defects in the PV modules of the PV installation, classifies detected defects, issues reports automatically, and retains technical data of every module included in the database of a PV installation for trend analysis and preventative and predictive maintenance analysis.

In one aspect, the system for automatically inspecting photovoltaic installations of a facility for generating electricity comprises:
a processor for receiving thermographic images of the photovoltaic installation, said photovoltaic installation comprising at least one array formed of a plurality of photovoltaic modules, wherein each module comprises a plurality of photovoltaic cells;
a database comprising identification data for each module of the photovoltaic installation;
wherein the processor comprises:
means for identifying each photovoltaic module in the acquired thermographic images of the photovoltaic installation;
means for calculating an average temperature of the at least one array; and
means for determining a fault condition of at least one cell as a function of a difference between a temperature of the at least one cell and the average temperature of the array.

Optionally, the means for identifying each photovoltaic module further comprises:
means for processing each image, further comprising:
means for executing, via the processor, at least one accommodation algorithm on the image, further comprising:
means for executing the accommodation algorithm with each of a plurality of accommodation algorithm parameters to generate a set of accommodated images corresponding to the image; and
means for converting each accommodated image to a binary image to produce a set of binary images.

In another aspect, the method of inspecting a photovoltaic installation of a facility for generating electricity comprises:
receiving thermographic images of the photovoltaic installation at a processor, said photovoltaic installation comprising at least one array formed of a plurality of photovoltaic modules, wherein each module comprises a plurality of photovoltaic cells;
receiving, at the processor, a database having identification data for each module of the photovoltaic installation;
identifying, via the processor, each photovoltaic module in the acquired thermographic images of the photovoltaic installation;
calculating, via the processor, an average temperature of the at least one array; and
determining, via the processor a fault condition of at least one cell as a function of a difference between a temperature of the at least one cell and the average temperature of the array.

Optionally, identifying, via the processor, each photovoltaic module in the acquired thermographic images of the photovoltaic installation further comprises:
processing each image, wherein processing each image comprises:
executing, via the processor, at least one accommodation algorithm on the image, wherein said executing the at least one accommodation algorithm on the image comprises:
executing the accommodation algorithm with each of a plurality of accommodation algorithm parameters to generate a set of accommodated images corresponding to the image; and converting each accommodated image to a binary image to produce a set of binary images.

Preferred embodiments of the invention are disclosed in dependent claims, hereby included by reference.

BRIEF DESCRIPTION OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

One purpose of the invention is to automatize the post processing of thermographic inspection images, improving the speed and reliability of the inspection by performing consistent, automatic analysis, automatically tracking trends via historical databases. The system automatically interprets images for information, reports on the interpreted information and issues guidance for addressing information reflected in the reported results.

In one embodiment, the system eliminates the human factor when identifying each infrared thermal-image with the corresponding panel or module. The system reduces the inspection time of large PV installations (e.g., megawatt solar plants). The system increases the reliability of inspection processes for photovoltaic solar plants. The system increases the efficiency of photovoltaic solar plants by rapidly identifying faulty equipment or devices.

In one embodiment, an automated thermography inspection system uses UAVs (i.e., drones) and automatic image processing to carry out automatic module degradation audits in large photovoltaic plants. The system inspects thermal and visual spectrum images, automatically detects defects and degradation trends with precise identification of affected modules. The system integrates with the SCADA system and monitors modules guaranteeing improved maintenance and follow up.

In one embodiment, the system performs a series of basic steps beginning with acquiring IR images of the PV plant (i.e., installation) and data identifying geolocation (e.g., GPS coordinates) of each structure (e.g., tracker) and module in the PV installation. The modules and structures are then identified in the IR or thermographic images. That is, the images are correlated to the modules and structures in the database. The images are automatically analyzed by the system to identify defects in the modules. The defects are reported together with suggested remediary actions, and the defects are stored in a database for trend analysis. The trend analysis may allow preventative maintenance routines to be developed.

Figure 1:
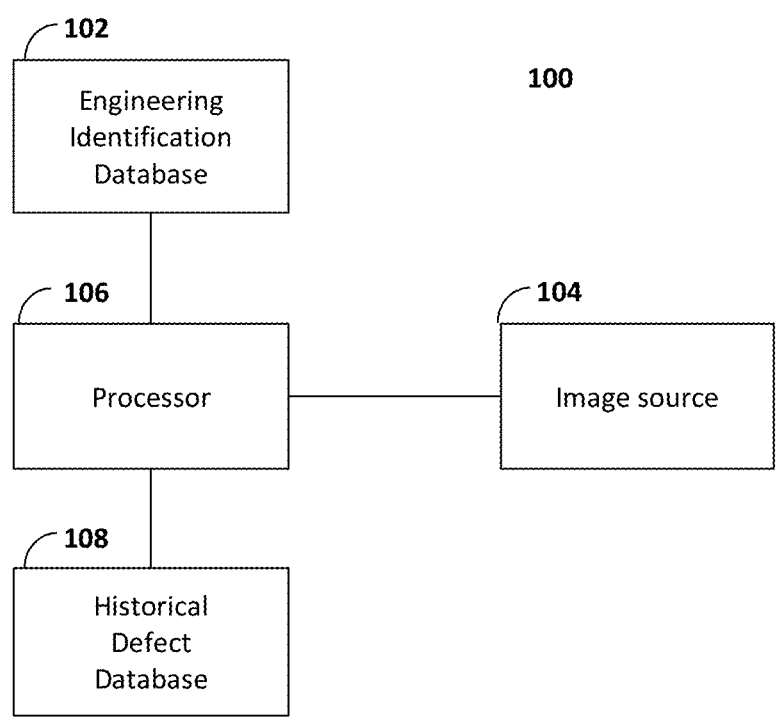
FIG. 1 is a block diagram of a system for automatically inspecting a photovoltaic (PV) installation of a facility for generating electricity according to one embodiment of the invention.

Referring to FIG. 1, in one embodiment, a system 100 for conducting automated inspections of a PV installation includes an identification database 102, an image source 104, a processor 106, and a historical defect database 108. The identification database has identification data (e.g., serial numbers and GPS coordinates or tracker column and row number) for each module of the PV installation. The images source 104 may be a drone executing a preprogrammed flight path and returning thermographic and visual (RGB) images of the PV installation. The processor 106 utilizes the identification database 102 and the images source 104 to determine defects in the modules of the PV installation. The processor 106 stores the detected defects in the historical defect database 108 for comparison to other inspections and trend analysis.

Figure 2:
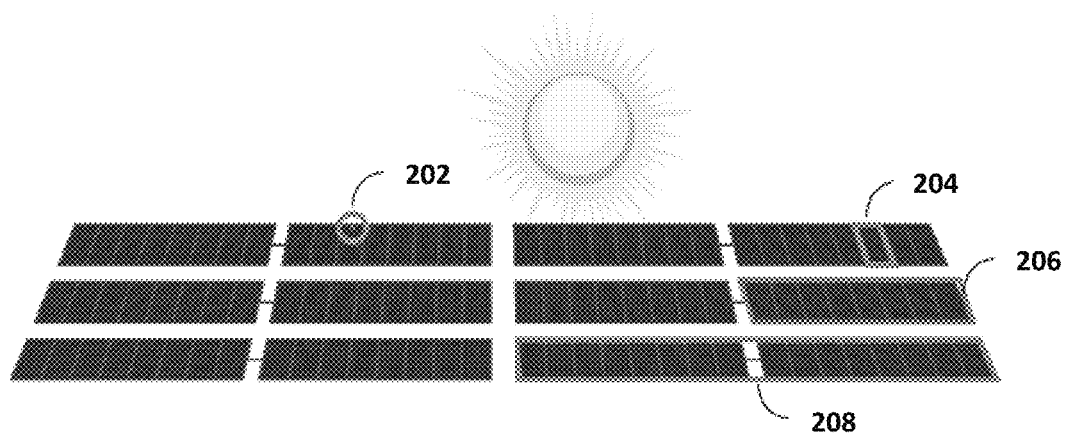
FIG. 2 is a perspective view of cells forming a module, modules forming a panel, and panels forming array.

Referring to FIG. 2, an example of large installation nomenclature is shown. A plurality of cells 202 form a module 204. A plurality of modules 204 form a panel 206. A plurality of panels 206 form an array 208. In one embodiment, there is one array 208 per tracker. A tracker is a physical mount for an array 208 that may be stationary and oriented toward an average sun position or may actively track the sun position to maximize the efficiency of the array 208 installed on the tracker. As used herein, array 208 and tracker are synonymous assuming that there is one array per tracker, but it is contemplated within the scope of the claims that there may be more than one array per tracker.

Figure 3:
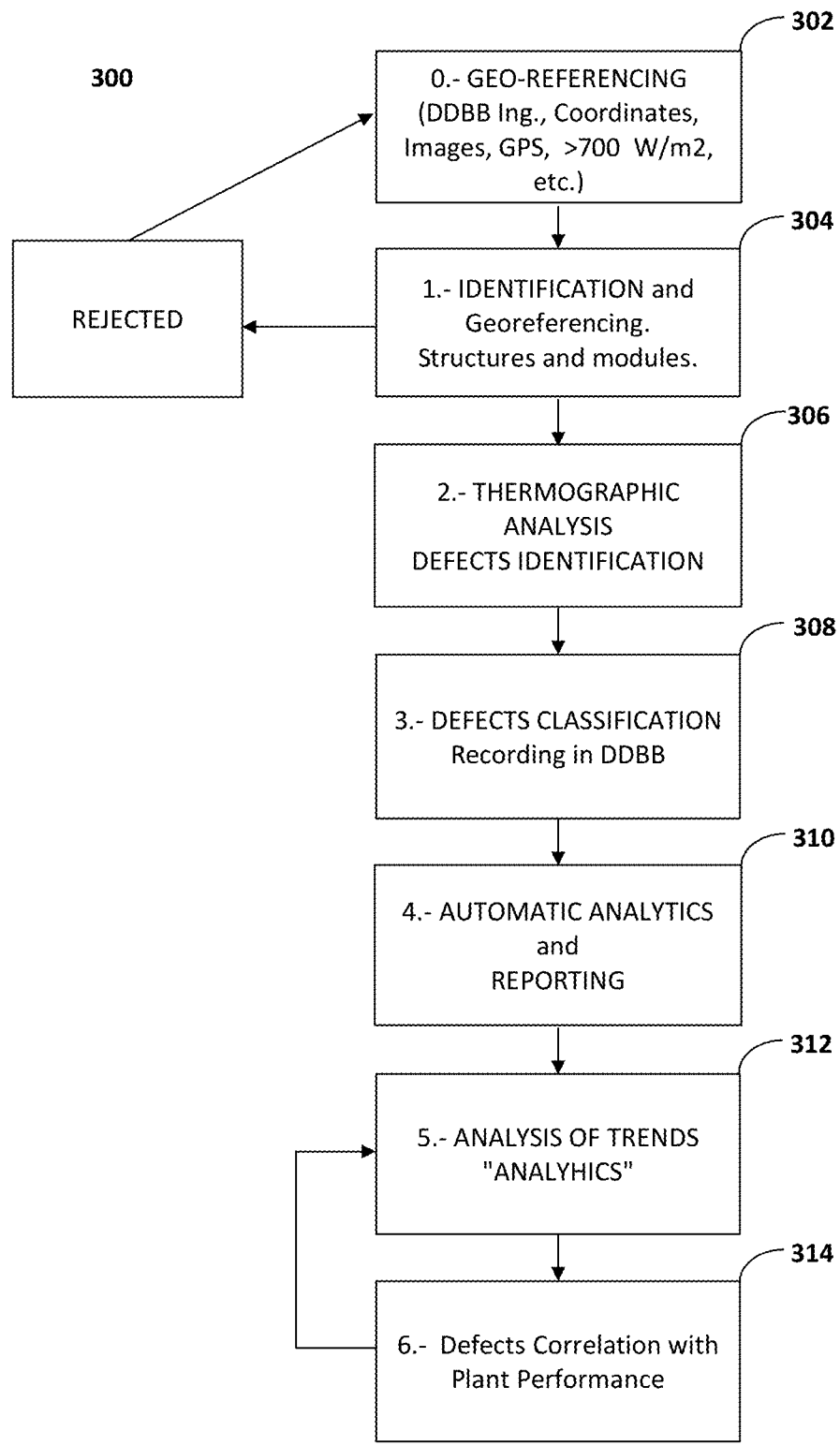
FIG. 3 is a flowchart of a method for automatically inspecting PV installation of a facility for generating electricity according to one embodiment of the invention.

Referring to FIG. 3, an overview of one embodiment of a method 300 executed by the system 100 is shown. At 302, geo-referencing is conducted for each module of the PV installation. That is, GPS coordinates and/or tracker row and column number are recorded for each module of the PV installation. At 304, engineering data such as serial numbers for each module within the PV installation is collected and cross-referenced with the geo-referencing data. At step 306, images are received by the system 100 and PV modules are identified within the images based on the geo-referencing data collected at steps 302 and 304. Thermographic analysis detects defects within the modules represented by the received images at 306. At 308, the defects in the modules detected at 306 are classified and recorded in the historical defect database 108. At 310, detected defects are reported to a user. At 312, defects recorded in the historical defect database 108 are analyzed trends. At 314, recorded defects are corrected, and system 100 cycles back to step 312 to identify the result of corrective actions on the defect trends. Generally, method includes inspecting a PV installation of a facility for generating electricity. The method includes receiving thermographic images of the PV installation at the processor 106. PV installation includes at least one array formed of a plurality of PV modules wherein each module includes a plurality of PV cells. The processor 106 receives the database 102 having identification data for each module of PV installation. The processor identifies each PV module in the acquired thermographic images of the PV installation, calculates an average temperature of the at least one array, and determines a fault condition of at least one cell as a function of the difference between temperature of the at least one cell at an average temperature of the array.

Figure 4:
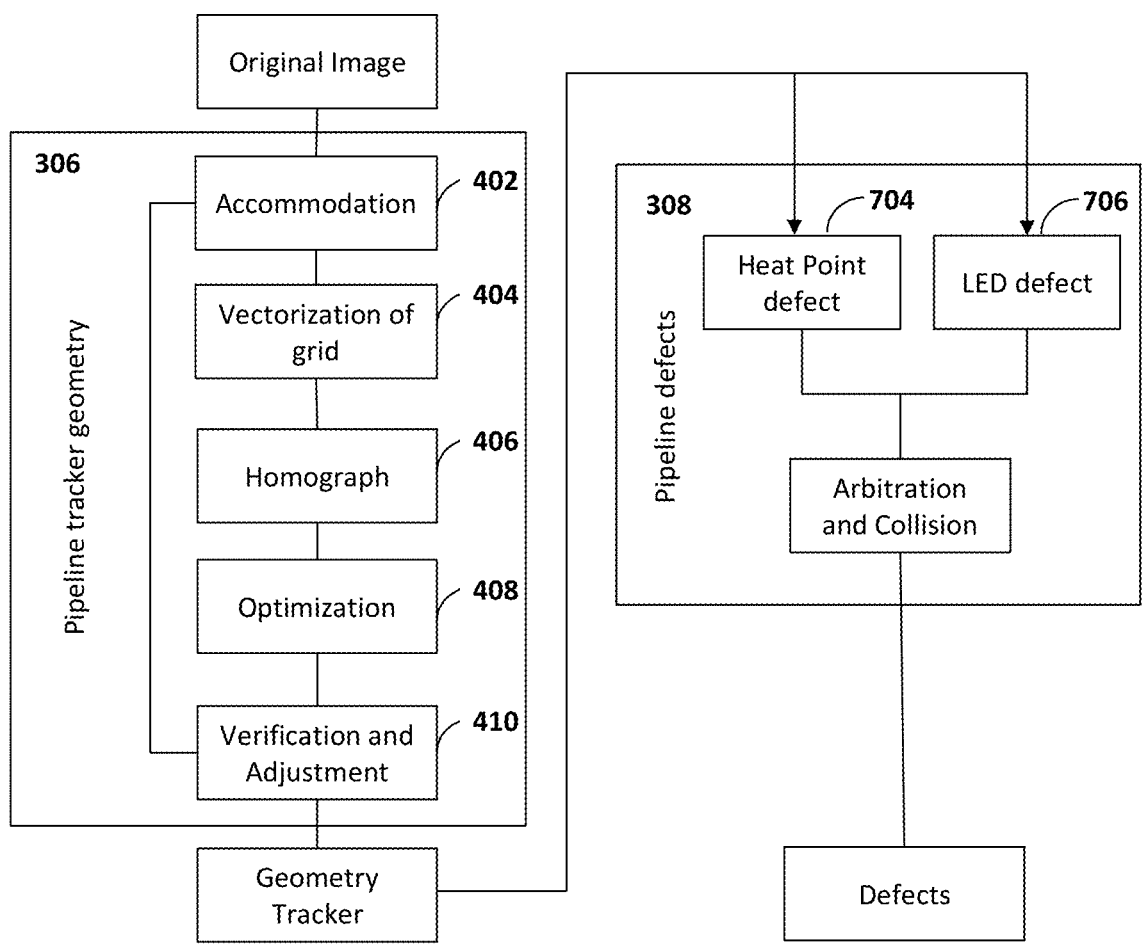
FIG. 4 is a flowchart of one embodiment of a method of thermographic analysis and defects identification of the method of FIG. 3.

In one embodiment, the thermographics analysis undertaken at 306 is a detailed set of subroutines and algorithms designed to automatically analyze the received images to determine defective trackers and modules in the PV installation. Referring to FIG. 4, the analysis includes a plurality of phases which may include combinations of image accommodation 402, vectorization 404, homographic analysis 406, optimization 408, and verification and adjustment 410.

Accommodation 402

At this stage, a sequence of filters are applied to the original image data in order to eliminate noise, detect edges, and prepare the images for the vectorization phase. Vectorization 404 is performed on the accommodated images.

Figure 5:
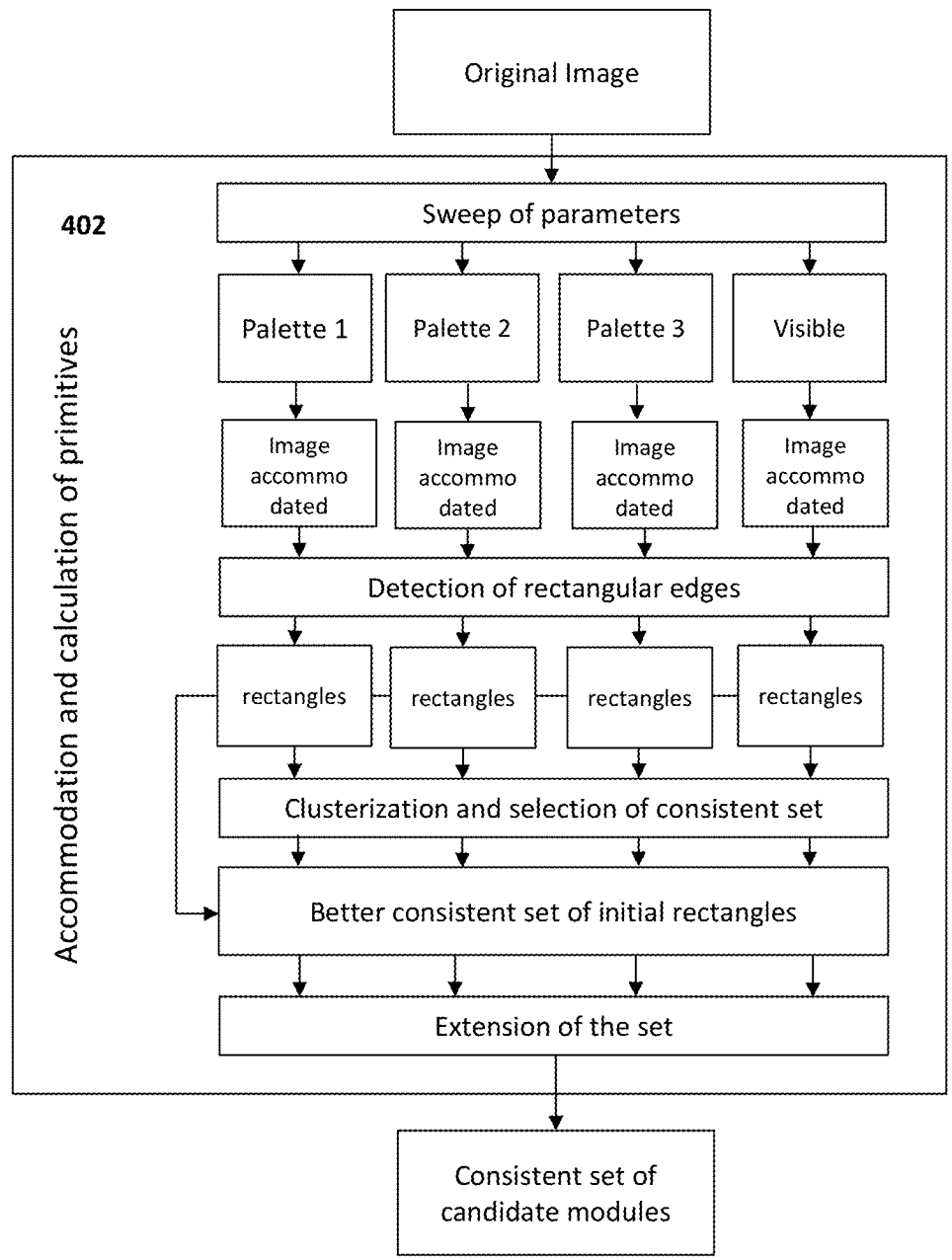
FIG. 5 is a flowchart of one embodiment of an accommodation algorithm of the method of FIG. 4.

Referring to FIG. 5, in one embodiment of the method of inspecting the PV installation of the facility for generating electricity and accommodation algorithm 402 or initial identification of modules is shown in detail. Processing each image includes executing via the processor 106 at least one accommodation algorithm on the image. Executing the at least one accommodation algorithm on the image includes executing the accommodation algorithm with each of a plurality of accommodation algorithm parameters to generate a set of accommodated images corresponding to the image. Executing the at least one accommodation algorithm on the image further includes converting each accommodated image to a binary image to produce a set of binary images.

The result of the accommodation stage is a consistent set of rectangles, however these do not form the grid of a tracker. The algorithms of the accommodation stage implement a filter which increases the possibilities of the detected rectangles belonging to tracker modules. However, these detected rectangles may not even be tracker modules. For example, they could be people, infrastructure external to the tracker, vehicles, or other background elements that may have a similar shape to the tracker or PV module (stones, areas with grass on the ground, paths, etc.). During this phase there may be no information used regarding the content of the image, the time of year, the time of day, the type of existing background, the palette used or even the solar field that is being addressed. Therefore, accommodation must manage the particularities of each of these variables. Thus, the original image is accommodated for the correct detection of the edges of objects appearing in the image. A variety of accommodation strategies have been developed which adapt to the diverse types of images that have formed part of the development stage, however, this set of accommodation strategies may be extended within the scope of the claims. These algorithms perform diverse operations at a pixel level including softening (i.e., blurring) and morphological operations (e.g., erosion, dilation, etc.). Each accommodation algorithm is made up of a set of parameters that must be appropriately configured to carry out a correct accommodation. Therefore, a sweep is performed through the different values that these parameters may have to determine the appropriate parameters. Accommodation concludes with a binarization of the image (i.e., converting the image to black and white) and execution of the Canny edge detection algorithm. The generated binary image and detected edges are the initial basis for the execution of polygon detection algorithms.

In one embodiment, processing each image further includes executing an edge detection algorithm on each binary image of the set of binary images to generate a set of edges associated with each of the plurality of accommodation algorithm parameters. The images with detected edges are used to obtain geometric edges in accordance with the algorithms for obtaining shapes or polygons in binary images. These shapes potentially represent the modules of one or more trackers. However, during this stage of the accommodation algorithm there is a high number of false positives. Any object or texture in the image may potentially be detected as a module candidate.

In one embodiment, processing each image further includes filtering non-trapezoidal shapes from the converted binary image. A series of filtering mechanisms are carried out during this stage which considers the geometric properties of each obtained shape individually. These obtained shapes are filtered in relation to an area or the geometry of the computed shape (i.e., shapes with a large surface area or a small surface area which cannot be solar modules given the known proportions of the target PV modules and trackers). Further, shapes with an appearance that are too elongated can be excluded as module candidates. Those obtained shapes whose form are similar to a rectangular element with an arbitrary orientation are then filtered. In practice, the solar modules form trapezoidal geometries, not rectangular, due to the effect of the perspective (i.e., keystone effect). However, these geometries can approximately become rectangles with an arbitrary orientation which adapt in the majority of cases to their surface area. The result of this stage is a set of rectangles which represents tracker module candidates. Many of these rectangles may still be false positives of objects external to the tracker or rectangles belonging to other trackers.

In one embodiment, processing each image further includes identifying trapezoids within the sets of edges generated from all of the binary images of the set of binary images. At least one cluster of trapezoids is identified in the identified trapezoid. The trapezoid in each identified cluster are filtered as a function of the surface area, orientation, and aspect ratio of the trapezoid to remove duplicate trapezoid and trapezoid succeeding a predetermined variance threshold for any of the surface area, orientation, and aspect ratio averages of the cluster to generate a tracker candidate cluster. This process applies a second filter to each set of rectangles. A group of sets of rectangles exists, one for each accommodation phase. Each one of these detections of rectangles (candidate modules) may detect some zones of the image better than others. For each group, an additional filtering is carried out on the rectangles, based on the principles of similarity of all the modules of the tracker: surface area, orientation, and aspect ratio. This stage is therefore a statistical analysis to discard outliers based on the above parameters. In addition, the set of candidate modules obtained must fulfill two additional principles to survive the filter: no overlaying candidate pairs, and geometrically grouped. After application of these filters, clusters of modules are obtained which potentially correctly identify modules of some part of the tracker (or other trackers) of the PV installation. The cluster with the highest number of elements of all the groups of rectangles correctly identifies a part of the main tracker. The biggest limitation to this result is that the number of candidate modules detected is usually lower than desired. This matter is resolved in the following stage: extension of the set.

In one embodiment, processing each image further includes determining whether each tracker candidate cluster is complete identifying any trapezoid in any of the binary images of the set of binary images have trapezoids within the predetermined variance threshold for all of the surface area, orientation, and aspect ratio averages of the tracker candidate cluster. Any identified trapezoids are added to the tracker candidate cluster. The aim of this stage is to obtain a larger consistent set of candidate modules. By starting with a consistent set of candidate modules it may be possible to recover other candidate modules from other accommodated images that verify the same parameters of similarity and overlaying. To do so they are added iteratively in order of similarity.

Vectorization 404

Vectorization is performed to obtain an initial set of primitive geometrics within each image from which to begin identifying PV modules represented in the image. In one embodiment, a graph is constructed based on the k-nearest neighbors algorithm and a consistent reticular patter is obtained which forms the initial hypothesis of a tracker (i.e., an array including PV modules).

In one embodiment, identifying the at least one cluster of trapezoids in the identified trapezoid includes identifying a plurality of clusters of trapezoids and filtering the trapezoids in each identified cluster results in generating a plurality of tracker candidate clusters. In this instance, processing each image further includes generating set of generally horizontal lines by connecting the center of each trapezoid in each cluster to each horizontally adjacent trapezoid in the cluster. In this instance, a generally horizontal line is meant to include any line that is more horizontal than vertical with respect to the image. A set of generally vertical lines are generated by connecting the center of each trapezoid in each cluster to each vertically adjacent trapezoid in the cluster. In this instance, a generally vertical line is more vertical than horizontal with respect image. The processor 106 then eliminates every cluster that corresponds to generally horizontal lines or generally vertical lines that do not match a plurality of generally horizontal lines and generally vertical lines generated for the image to identify a plurality of candidate modules, each corresponding to an intersection of the remaining generally horizontal lines and generally vertical lines. The processor 106 stores the trapezoid corresponding to each of the identified plurality of candidate modules. This process orders the set of candidate modules into a grid shape to verify the number of rows and columns entered in the input. The starting point is the construction of a pseudo grid based on the closeness of the modules. The centers of the rectangles are connected to other neighboring rectangles. These line patters are selected and filtered only accepting those that are parallel or perpendicular to the typical rectangle orientation. Those lines are candidates to be rows or columns of the grid. One problem that arises during this stage is the existence of candidate modules which are false positives. Subsequently, any line generated may belong to external objects (e.g., vehicles, rocks, people) or other modules of other trackers. In order to attenuate this problem, the straight lines are clustered into sets of straight lines with a certain degree of geometric parallelism. If more than two groups (i.e., horizontal and vertical) appear in the cluster, the straight lines are discarded as they contain false positives (i.e., they indicate a tracker and PV modules that is not actually a tracker and PV modules). The set of straight lines is classified according to their orientation (vertical or horizontal). The straight lines are detected and categorized into two groups: horizontal and vertical based on the horizontal and vertical axes of the image (based on being within a predetermined threshold of parallelism with the horizontal and vertical axes such as 15 degrees). If any group has lines intersecting within the limits of the image, then the corresponding tracker candidate is eliminated. The straight lines are not fully parallel given the existence of a perspective effect (i.e., keystone effect), but they should not actually intersect if they match any tracker. The sets of horizontal and vertical straight lines are ordered and a statistical analysis is carried out of the distances between the straight lines. The groups of straight lines must have a similar spacing with a monotonically increasing or decreasing distance (due to the perspective or keystone). Thus, inconsistent gaps or straight lines which are too close can be identified. The set of straight lines may be broken into two or more parts, in this case the best aligned and largest subset is selected. In this way, the majority of the rows and columns which contain false modules, or modules belonging to other nearby trackers are eliminated.

Vectorization concludes with obtaining a rectangular grid patter or matrix based on the intersections between the sets of straight and parallel lines, wherein the majority of the intersections coincide with the center of a candidate module. This candidate module is stored in a candidate matrix. In addition, there are intersections which do not coincide with the detection of any candidate module, these are negative detections of modules. An artificial module is constructed with an orientation and size similar to its neighbors located in the center of the intersection. The resulting candidate matrix may contain all the modules of the track in question, a part of them, or even a higher number of rows and columns due to the existence of external false positives such as other trackers or other correctly aligned objects.

Homographic Matrix Calculation 406

Homographic analysis detects the pose (i.e., perspective and orientation) of a subject tracker within an image. That is, the homographic analysis or matrix calculation accounts for orientation and keystone correction to match a tracker or array of modules to an idealized grid patter of known size and dimensions. The idealized grid patter is determined from the engineering data (identification database 102) for the PV installation.

In one embodiment, processing each image further includes identifying the corners of each of the store trapezoids corresponding to each of the identified plurality of candidate modules. The processor 106 determines homographic matrix to match the identified corners of each stored trapezoids to an ideal grid of predetermined proportions corresponding to the modules represented in the image. The processor 106 translates the identified corners of each of the store trapezoids to the ideal grid via the homographic matrix. The processor 106 then applies a compensation algorithm to the translated identified corners and the ideal grid to determine the position of the ideal grid with respect to the translated identified corners. The processor 106 then translates the ideal grid in the determined position of the ideal grid to the image via an inverse of the homographic matrix. In one embodiment, the compensation algorithm is one of a random sample consensus (RANSAC) algorithm and a least squares algorithm. The aim of this stage is to obtain a more precise definition of the modules, which takes into account the effects of perspective (i.e., keystone effect) to infer the position of the tracker on the original thermographic image with precision. This also enables the system to obtain an orthogonal image of the tracker on an ideal rectangular plane from the original thermographic image. This stage is based on the premise that all the modules are equal in actual size and shape such that they form an ideal matrix of rows and columns. Thus, the only factor that affects the shape of the modules detected in the original thermographic image is the perspective (i.e., keystone). This assumption is used to find the formula that correlates the original image view or perspective to the ideal orthogonal view. Starting with a matrix of candidate modules, each candidate module is an approximate version of an actual module. The candidate module contains errors (though not excessively high): in orientation, surface area and shape. The shape of the modules in the original image is trapezoidal due to the perspective of the camera, however, the candidate modules photographed at that moment are rectangular. With the aim of obtaining the trapezoidal shape of the modules with greater precision, an average is taken of the corners of the rectangles with corners closest to the neighboring modules nearest to that corner. In other words, for each 2×2 matrix of rectangles, the corner shared by these four modules is obtained with greater precision. The corners of the modules in the original image are not calculated to perfection, each one may have an error. However, the errors of each corner may be compensated against each other starting with the assumption that the modules are equal and their differences are only due to perspective. Starting from the known ideal position of these corners on the ideal orthogonal view, a search is carried out of the homographic matrix which associates the corners in the original image to the corners in the ideal orthoganal image. To do so, a variant of the RANSAC algorithm is used, although in order to accelerate its functioning a least squares algorithm may be used. Once the homographic transformation matrix is obtained, the corners of the tracker modules are calculated with more precision. Starting from the ideal position of the corners in the orthogonal image, the inverse homographic matrix is applied so as to obtain the corners corrected in the original perspective image. As a result, the set of the sum of the errors of the corners relating to the ideal tracker will be reduced. Furthermore, a set of corners that take into consideration that all the tracker modules have the same actual size and shape is now obtained. The precision of the corners increases and is more consistent.

Corner Optimization 408

Corner optimization or gradient descent optimization optimizes, refines, and adjusts the borders of the grid's modules to more precisely match the idealized grid to the tracker in the image being processed.

In one embodiment, processing each image further includes optimizing the position of the translated ideal grid with respect to the image processor 106 iteratively moves the translated ideal grid 1 pixel in each direction up to a quantity of pixels equal to 2 times a quantity of the identified corners of each of the stored trapezoids corresponding to each of the identified plurality of candidate modules; applies a gradient algorithm to the moved grid to determine fit; and selects the position of the translated ideal grid with respect to the image having the highest fit according to the applied gradient algorithm. In one embodiment, each image of the plurality of received thermographic images includes image attributes including latitude, longitude, altitude, pitch, roll, and direction. In one embodiment, each image of the plurality of received thermographic images further includes image attributes including date, time, and a corresponding visual red green blue (RGB) image. The corner optimization phase improves the precision of the tracker and its modules. During this phase, a series of algorithms are executed at a pixel level which improve the precision in the shape of the grid with respect to the modules represented in the original image and which correct and improve the precision of the homographic matrix which compares the original image to the orthogonal image (ideal grid image). This phase consists of diverse optimization algorithms based on two principles: the direct optimization on the perspective image and the optimization on the orthogonal image. In the direct optimization on the original image, an optimization algorithm is carried out by performing small modifications in all the directions of the corners of the modules. The search area of this algorithm is n-dimensional where n is the 2* (number of corners) of the image. The cost/fitness function to optimize is defined as the sum of the intensity value of all the internal lines of the tracker. As a result, all the internal borders of the modules tend to move towards the borders that are always represented with a darker color than that of the tracker. After each small modification, an evaluation of the cost/quality of the new modified version is carried out. The algorithm calculates the gradient in the search area by carrying out the most pertinent modification (which most improves the quality of the grid match to the tracker array) until reaching a quality that cannot be further improved.

Deliberative Analysis 410

Verification and adjustment or deliberative analysis utilizes an ID3 decision tree machine learning technique. It identifies false positives and true negatives in the module detection based on statistical parameters of the regions of the image which are candidates for belonging to a module.

Figure 6:
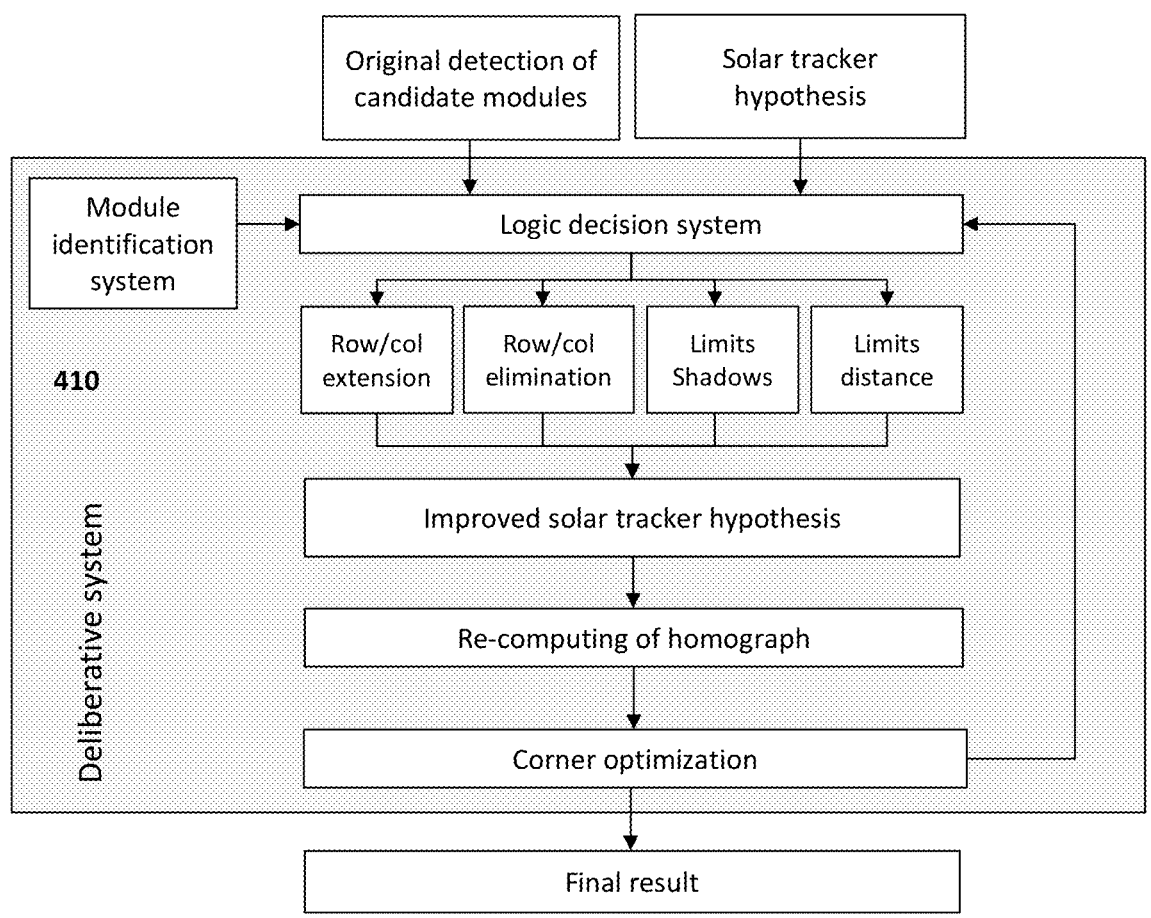
FIG. 6 is a flowchart of one embodiment of a verification and adjustment algorithm of the method of FIG. 4.

Referring to FIG. 6, in one embodiment, the grid identifies candidate modules in the database of modules, and processing each image further includes determining a tracker hypothesis as a function of the image attributes associated with the image and the database including identification data for each module of the PV installation. The tracker hypothesis includes a quantity of modules in rows and columns of a tracker represented in the image. So processing further includes applying at least one of: row and column extension, row and column elimination, shadow limits, and distance limits, to the candidate modules identified by the grid to add or remove modules from the candidate modules identified by the grid and expand or reduce the grid as a function of the added or removed candidate modules. The processor associates identification data from the database with each module identified by the reduced or expanded grid. The deliberative analysis phase detects, using logical rules, any possible faults in the detection obtained by all the previous algorithms of the method, focusing particularly on three areas: detecting the remainder of partially detected trackers; identifying trackers with incorrectly detected rows or columns and eliminating them; and determining whether a detected tracker is an incomplete tracker. In short, this phase focuses on verifying and correcting, using logical rules, the results obtained in the previous phases according to geometric and mathematical criteria. The system follows a modular architecture of components which can be optionally activated. The developed components are: row and column extender, row and column eliminator, detection of distance limits between modules, and detection of shadow limits. For internal functioning purposes, all these components make use of an additional tool: the "cell identification system". This system acts as an oracle in such a manner that it can discern whether a region of the space belongs to a tracker module, the background or a border area. The above described components use the cell identification system when the information to infer whether the area of space is a tracker module or not, is confusing or incomplete.

Defect Detection 308

Referring back to FIG. 4, in one embodiment, the average temperature of the array is determined by the processor 106 by averaging a temperature value of each pixel of the thermographic images corresponding to the array. In another embodiment, the processor disregards any images in excess of 1 per PV array and includes in the average temperature value only pixels corresponding to panels of the array.

In heat spot detection 704, an auxiliary thermographic image is used in which each pixel takes as its value a heat point identity to which it is assigned. A sweep threshold temperature is used (from the maximum temperature in the module to a predetermined threshold minimum temperature)

in order to decide whether a new heat point is to be created. Should an isolated pixel appear where the threshold temperature is subsequently exceeded, this is labeled as a new spot heat point. Super fragmentation of heat points effect occurs on a regular basis, given that even some neighboring pixels which appear to have the same level of intensity are subject to small variations which form maximums of intensity, thus becoming candidates as heat points.

In order to avoid super fragmentation, it is necessary to consider that neighboring pixels which share the same threshold temperature belong to the same heat point. Thus a flooding algorithm may be used starting with the selected pixel to discover in a recursive manner the set of neighboring pixels that share the same temperature. All the flooded pixels are labeled with the same heat point identifier. This push flooding mechanism is used in the creation of a new heat point, but it cannot be used to create a heat point in so far as it continues the temperature sweep. If the push flooding mechanism is used when multiple heat points are close together, this may result in a heat point merging with another heat point. This effect is avoided using the pull flooding mechanism. The Pull flooding mechanism is used to label a new pixel in such a manner that it searches for the closest heat point. This mechanism acts when the pixel is not labeled as a heat point and none of its neighbors are heat points. Thus, the new pixel "recursively searches" for its closest heat point. The procedure is as follows: the pixel is flooded with neighboring pixels that verify the current temperature threshold until reaching an existing heat point. The first heat point reached is the one considered as the spot for those pixels (following a criteria of closeness). In this case, all the flooded pixels belong to the previously existing closest heat point. If the flooding does not reach an existing heat point (due to the temperature of the current sweep), the whole group is labeled as a new heat point, and then the push flooding mechanism will activate. The pull segregation mechanism functions correctly in the majority of situations. However, in the case that the unlabeled region neighbors more than one heat point the situation is not fully managed.

The current implementation has a bias in the selection of heat points in the top left area of a module. This is due to the original pixel of the pull algorithm being selected using a simple run of rows and columns of the image starting in the top left corner. In one embodiment, an improvement of the pull algorithm is to identify the unlabeled region (set of pixels with the same level of intensity) starting from its center of gravity. Thus, a previously existing closer heat point would be added based on its center of gravity. Given that the whole region of unlabeled pixels has the same level of intensity, segregation of the region into several subregions could be considered, in which each one would be annexed to the closest heat point.

In one embodiment, after performing the complete sweep of temperatures, a set of heat points has been determined. Each heat point forms a descending gradient, from their spot with the maximum value, in the interior of the heat point, to their outermost borders with the minimum value of the heat point. The heat points are then filtered by size and shape where only heat points are accepted that have a square area with one side larger than the threshold given as a parameter. There are heat points which, in spite of not fulfilling the shape and size criteria, neighbor (share borders) with other heat points. To the human eye, the resulting effect is of a large heat point ignoring some areas with high temperatures at its outermost borders. At a theoretical level this is correct given that it is a heat point of a small size which has been discarded. In one embodiment, when a small heat point (which does not fulfill the size restrictions) shares a border with another larger heat point, the larger heat point merges with the smaller heat point. This way, the resulting heat spot has more than one heat point. In the case that the heat point neighbors more than one heat point, then the smaller sized heat point is split so that its pixels belong to the nearest heat point of sufficient size, according to the pull flooding algorithm. This avoids splitting in the areas of greater intensity of the discarded heat point.

In one embodiment, the array includes a plurality of rows of modules, each row of the array having a different vertical height than the other rows of the array. The average temperature of the array is determined, via the processor 106, by averaging a temperature value of each pixel in the thermographic images corresponding to a given row of modules in the array. Determining a fault condition includes comparing the temperature of each cell in the array to the average temperature of the row to which the cell corresponds.

In one embodiment, the array includes a plurality of modules. The average temperature of the array is determined via the processor 106 by averaging a temperature value of each pixel in the thermographic images corresponding to a selected module in the array. The processor then determines a fault condition by comparing the temperature of each pixel in the image corresponding to the module to the average temperature of the module. The processor 106 determines a hotspot in the selected module when a pixel exceeds the average temperature of the module by predetermined minimum temperature threshold. In one embodiment, when the processor 106 determines a hotspot, adjacent pixels determined as a hotspot are grouped together into a single hotspot. The processor 106 disregards the single hotspot when a size of the single hotspot does not exceed a predetermined minimum size threshold.

The band detector algorithm 706 is a complementary strategy for detecting defects which is optionally used in parallel to the Spot Heat Point Detector system 704. The algorithm initially evaluates the mean temperature of each column individually for each module. To do so, it uses the orthogonal thermographic image. During this evaluation of the columns, a percentage of pixels in the upper and lower part of the column is ignored because dark pixels typically appear in the upper and lower borders of each column. In one embodiment, this default value is 5%. The columns that exceed the minimum temperature are highlighted. This temperature threshold parameter is the same as that used by the "Spot Heat Point Detector" algorithm. Thus, the band detector 706 searches for a number of consecutive columns marked as defective in order to achieve a defect of a band exceeding a predetermined width of the module. In one embodiment, this width is relative to the total width of the module. In one embodiment, the default value of this width parameter is 18%.

In one embodiment, processing the image includes translating the pixels of the image of the module via a homographic matrix to an ideal grid. In this embodiment, determining a fault condition includes determining a faulty column when the translated pixels corresponding to each module in each column of the ideal grid exceed the average temperature by the predetermined threshold. The top and bottom portion of the pixels each column of the ideal grid are ignored because they are typically dark. A defective band is determined when a quantity of adjacent determined faulty columns exceeds a predetermined threshold with that the module. In one embodiment, the portion of pixels each column that is ignored is 5%, and the predetermined threshold with the module is 18%.

It will be understood by those of skill in the art that navigating between user interface views is accomplished by selecting a tab or object in a current user interface view corresponding to another user interface view, and in response to selecting the tab or object, the user interface updates with said another user interface view corresponding to the selected tab or object.

It will be understood by those of skill in the art that providing data to the system or the user interface may be accomplished by clicking (via a mouse or touchpad) on a particular object or area of an object displayed by the user interface, or by touching the displayed object in the case of a touchscreen implementation.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The invention claimed is:

1. A method of inspecting a photovoltaic (PV) installation of a facility for generating electricity, said method comprising:
   receiving thermographic images of the PV installation at a processor, said PV installation comprising at least one array formed of a plurality of PV modules, wherein each module comprises a plurality of PV cells;
   receiving, at the processor, a database having identification data for each module of the PV installation;
   identifying, via the processor, each PV module in the acquired thermographic images of the PV installation, wherein identifying each PV module comprises:
   processing each image, wherein processing each image comprises:
      executing, via the processor, at least one accommodation algorithm on the image, wherein said executing the at least one accommodation algorithm on the image comprises:
         executing the accommodation algorithm with each of a plurality of accommodation algorithm parameters to generate a set of accommodated images corresponding to the image; and
         converting each accommodated image to a binary image to produce a set of binary images;

executing an edge detection algorithm on each binary image of the set of binary images to generate a set of edges associated with each of the plurality of accommodation algorithm parameters;

filtering non-trapezoidal shapes from the converted binary image;

calculating, via the processor, an average temperature of the at least one array; and determining, via the processor a fault condition of at least one cell as a function of a difference between a temperature of the at least one cell and the average temperature of the array.

2. The method of claim 1, wherein identifying each PV module further comprises:

processing each image, wherein processing each image further comprises:

identifying trapezoids within the sets of edges generated from all of the binary images of the set of binary images;

identifying at least one cluster of trapezoids in the identified trapezoids;

filtering the trapezoids in each identified cluster as a function of the surface area, orientation, and aspect ratio of each trapezoid to remove duplicate trapezoids and trapezoids exceeding a predetermined variance threshold for any of the surface area, orientation, and aspect ratio averages of the cluster to generate a tracker candidate cluster.

3. The method of claim 2, wherein identifying each PV module further comprises:

processing each image, wherein processing each image further comprises:

determining whether each tracker candidate cluster is complete by identifying any trapezoids within any of the binary images of the set of binary images have trapezoids within the predetermined variance threshold for all of the surface area, orientation, and aspect ratio averages of the tracker candidate cluster; and adding any identified trapezoids to the tracker candidate cluster.

4. The method of claim 3, wherein identifying each PV module further comprises:

processing each image, wherein identifying the at least one cluster of trapezoids in the identified trapezoids includes identifying a plurality of clusters of trapezoids and filtering the trapezoids in each identified cluster results in generating a plurality of tracker candidate clusters, and wherein processing each image further comprises:

generating a set of generally horizontal lines by connecting the center of each trapezoid in each cluster to each horizontally adjacent trapezoid in the cluster, wherein each generally horizontal line is more horizontal than vertical with respect to the image;

generating a set of generally vertical lines by connecting the center of each trapezoid in each cluster to each vertically adjacent trapezoid in the cluster wherein each generally vertical line is more vertical than horizontal with respect to the image;

eliminating every cluster that corresponds to generally horizontal lines or generally vertical lines that do not match a plurality of generally horizontal lines and generally vertical lines generated for the image to identify a plurality of candidate modules, each corresponding to an intersection of the remaining generally horizontal lines and generally vertical lines; and storing the trapezoid corresponding to each of the identified plurality of candidate modules.

5. The method of claim 4, wherein identifying each PV module further comprises:

processing each image, wherein processing each image further comprises:

identifying the corners of each of the stored trapezoids corresponding to each of the identified plurality of candidate modules;

determining a homographic matrix to match the identified corners of each of the stored trapezoids to an ideal grid of predetermined proportions corresponding to the modules represented in the image;

translating, via the homographic matrix, the identified corners of each of the stored trapezoids to the ideal grid;

applying a compensation algorithm to the translated identified corners and the ideal grid to determine a position of the ideal grid with respect to the translated identified corners; and translating, via an inverse of the homographic matrix the ideal grid in the determined position of the ideal grid to the image.

6. The method of claim 5, wherein the compensation algorithm is one of a random sample consensus (RANSAC) algorithm and a least squares algorithm.

7. The method of claim 5, wherein identifying each PV module further comprises:

processing each image, wherein processing each image further comprises:

optimizing the position of the translated ideal grid with respect to the image by iteratively;

moving the translated ideal grid one pixel in each direction up to a quantity of pixels equal to two times a quantity of the identified corners of each of the stored trapezoids corresponding to each of the identified plurality of candidate modules; and applying a gradient algorithm to the moved grid to determine fit; and selecting the position of the translated ideal grid with respect the image having the highest fit according to the applied gradient algorithm.

8. The method of claim 7, wherein each image of the plurality of received thermographic images comprises image attributes comprising: latitude, longitude, altitude, pitch, roll, and direction.

9. The method of claim 8, wherein identifying each PV module further comprises:

processing each image, wherein the grid identifies candidate modules in the database of modules, and wherein processing each image further comprises:

determining a tracker hypothesis as a function of the image attributes associated with the image and the database comprising identification data for each module of the PV installation, wherein said tracker hypothesis comprises a quantity of modules in rows and columns of a tracker in the image;

applying at least one of: row and column extension, row and column elimination, shadow limits, and distance limits, to the candidate modules identified by the grid to add or remove modules from the candidate modules identified by the grid and expand or reduce the grid as a function of the added or removed candidate modules; and associating identification data from the database with each module identified by the reduced or expanded grid.

10. The method of claim 7, wherein each image of the plurality of received thermographic images comprises image attributes comprising: a date and time, a corresponding Red Greed Blue (RGB) image, latitude, longitude, altitude, pitch, roll, and direction.

11. The method of claim 1, wherein the average temperature of the array is determined, via the processor, by averaging a temperature value of each pixel of the thermographic images corresponding to the array.

12. The method of claim 11, wherein:
the processor disregards any images in excess of one per panel; and
includes in the average temperature value only pixels corresponding to panels of the array.

13. The method of claim 1, wherein:
the array comprises a plurality of rows of modules, each row of the array having a different vertical height than the other rows of the array;
the average temperature of the array is determined, via the processor, by averaging a temperature value of each pixel in the thermographic images corresponding to a given row of modules in the array; and
determining a fault condition comprises comparing the temperature of each cell in the array to the average temperature of the row to which the cell corresponds.

14. The method of claim 1, wherein:
the array comprises a plurality of modules;
the average temperature of the array is determined, via the processor, by averaging a temperature value of each pixel in the thermographic images corresponding to a selected module in the array; and
determining a fault condition comprises comparing the temperature of each pixel in the image corresponding to the module to the average temperature; and
determining a hot spot in the selected module when a pixel exceeds the average temperature of the module by a predetermined minimum temperature threshold.

15. The method of claim 14, wherein:
adjacent pixels determined as a hot spot are grouped together into a single hot spot; and
disregarding the single hot spot when a size of the single hot spot does not exceed a predetermined minimum size threshold.

16. The method of claim 14, wherein:
processing the image comprises translating the pixels of the image of the module via a homographic matrix to an ideal grid; and
determining a fault condition comprises:
determining a faulty column when the translated pixels corresponding to each module in each column of the ideal grid exceed the average temperature by the predetermined threshold, wherein a top and bottom portion of the pixels in each column of the ideal grid are ignored; and
determining a defective band when a quantity of adjacent determined faulty columns exceeds a predetermined threshold width of the module.

17. The method of claim 16 wherein:
the portion of the pixels in each column is 5% and the predetermined threshold width of the module is 18%.

18. A system for automatically inspecting photovoltaic installations of a facility for generating electricity comprising:
a processor for receiving thermographic images of the photovoltaic installation, said photovoltaic installation comprising at least one array formed of a plurality of photovoltaic modules, wherein each module comprises a plurality of photovoltaic cells;
a database comprising identification data for each module of the photovoltaic installation;
wherein the processor is configured for:
identifying each photovoltaic module in the acquired thermographic images of the photovoltaic installation
processing each image of the acquired thermographic images, wherein processing each image comprises:
executing at least one accommodation algorithm on the image, wherein said accommodation algorithm comprises:
executing the accommodation algorithm with each of a plurality of accommodation algorithm parameters to generate a set of accommodated images corresponding to the image; and
converting each accommodated image to a binary image to produce a set of binary images;
wherein processing each image further comprises:
executing an edge detection algorithm on each binary image of the set of binary images to generate a set of edges associated with each of the plurality of accommodation algorithm parameters;
filtering non-trapezoidal shapes from the converted binary image;
calculating an average temperature of the at least one array; and
determining a fault condition of at least one cell as a function of a difference between a temperature of the at least one cell and the average temperature of the array.

* * * * *